US005477606A

United States Patent [19]

Igura

[11] Patent Number: 5,477,606

[45] Date of Patent: Dec. 26, 1995

[54] ASSEMBLY GUIDING APPARATUS FOR WIRING HARNESS SUBASSEMBLIES

[75] Inventor: Toshinori Igura, Shizuoka, Japan

[73] Assignee: Yazaki Corporation, Tokyo, Japan

[21] Appl. No.: 354,230

[22] Filed: Dec. 12, 1994

[30] Foreign Application Priority Data

Dec. 14, 1993 [JP] Japan .................................... 5-313036

[51] Int. Cl.$^{6}$ ............................ B23Q 15/00; H01R 43/20

[52] U.S. Cl. ................................................ 29/721; 29/748

[58] Field of Search .............................. 29/717, 718, 720, 29/721, 747, 748, 750, 752, 759, 33 M, 703; 269/903

[56] References Cited

U.S. PATENT DOCUMENTS

| | | | |
|---|---|---|---|
| 3,913,202 | 10/1975 | Pyle et al. | 29/721 |
| 4,727,637 | 3/1988 | Buckwitz et al. | 29/721 X |
| 4,742,612 | 5/1988 | Dokan et al. | 29/748 X |
| 5,198,983 | 3/1993 | Blake et al. | 29/721 X |

OTHER PUBLICATIONS

"Relative Alignment System For Robot Part Insertion Operations" IBM Technical Disclosure Bulletin, vol. 31, No. 2, Jul. 1988, pp. 19–21.

*Primary Examiner*—Peter Vo
*Attorney, Agent, or Firm*—Armstrong, Westerman, Hattori, McLeland & Naughton

[57] ABSTRACT

The assembly guiding apparatus for wiring harness subassemblies facilitates assembly work by indicating the connector to be used and displaying the terminal insertion position in the connector. The apparatus comprises: a plurality of connector boxes 3 containing connectors, each of which is provided with an indicator lamp 4 and a light interception sensor 5 facing a connector pick-up opening 14; an incrementing sensor 8 installed on the pick-up side of terminated wires 7 that are arranged in line on a wire supporting device 6; an indicator 10 that indicates with light a contour of the connector 2 and positions of terminal accommodating chambers in the connector 2; and a controller 13 incorporating a CPU and a memory, both connected to the indicator lamp, the light interception sensor, the incrementing sensor and the indicator. The apparatus also includes: a count means linked to the incrementing sensor to detect the number of remaining terminal accommodating chambers in the connector, or the sum of the number of all terminals in the wiring harness subassembly and the number of all connectors; a count means that is activated when the number of remaining terminal accommodating chambers is one; and a reset means which is activated when the total sum is counted up.

5 Claims, 3 Drawing Sheets

ASSEMBLY GUIDING APPARATUS FOR WIRING HARNESS SUBASSEMBLIES

BACKGROUND OF THE INVENTION

1. Field of the Invention

The present invention relates to an assembly guiding apparatus for wiring harness subassemblies that facilitates the assembly work by indicating a connector to be bused and a position in the connector into which a terminal is to be inserted.

2. Description of the Prior Art

FIG. 4 shows a conventional assembly guiding apparatus for wiring harness subassemblies.

The assembly guiding apparatus 30 includes a connector receptor device 32, which is provided with a plurality of connector insertion holes 31 and with a plurality of indicator lamps 33 corresponding to terminal accommodating chambers in a connector (not shown). The apparatus also includes a controller 34 which successively displays on the indicator lamps 33 the order of inserting terminals into the connector set in the insertion holes.

A check on terminal insertion is made by conduction pins 35 provided in the connector insertion holes 31. A signal from a conduction pin 35 works as a trigger to cause the next terminal position to be indicated. Terminated wires are arranged in line on a rod-like wire supporting device (not shown) so that a worker can take the terminal wires successively, starting from the end of the wire supporting device, to insert them into the connector.

With the above-mentioned conventional apparatus, however, because the connector receptor device 32 can accept only a particular shape of connector, processing a variety of kinds of connectors requires many kinds of connector receptor devices 32. Not only is this costly, but it increases the size of the apparatus 30, making it impossible to deal swiftly with unexpected design changes and inevitably increasing the number of preparatory steps required to switch the type of wiring harness to be assembled.

SUMMARY OF THE INVENTION

In light of the above drawbacks, the present invention is intended to provide an assembly guiding apparatus for wiring harness subassemblies, which can guide the terminal assembly procedure for a variety of connector types and which is advantageous in terms of cost, is not large in size, requires no additional preparatory steps for switching the type of wiring harness, and can cope with unexpected design changes.

To achieve the above objectives, the assembly guiding apparatus for wiring harness subassemblies according to this invention comprises: a plurality of connector boxes containing connectors, each of which is provided with an indicator lamp and a light interception sensor facing a connector pick-up opening; an incrementing sensor installed on the pick-up side of terminated wires that are arranged in line on a rod-like wire supporting device; an indicator that indicates with light a contour of the connector and positions of terminal accommodating chambers in the connector; and a controller incorporating a CPU and a memory, both connected to the indicator lamp, the light interception sensor, the incrementing sensor and the indicator; wherein the controller displays the connector's contour stored in the memory onto the indicator, turns on the indicator lamp of the connector box containing connectors whose shape is the same as that of the contour stored in the memory, and successively displays on the indicator the positions of the terminal accommodating chambers stored in the memory each time the incrementing sensor is activated.

The shape of the connector to be used is displayed blinking. At the same time, the indicator lamp of one of the connector boxes that contains a connector to be used is blinked. When a worker picks up a connector from the indicated connector box, the light interception sensor is activated to detect the connector removal and make preparations for the next assembly procedure, such as displaying the connector contour on the indicator. Next, when the worker picks up a terminated wire from the wire supporting device, the incrementing sensor is activated to indicate the position where the terminal should be inserted, as by blinking of that position. The worker can now watch the indicator and insert the terminals one after another according the display until a wiring harness subassembly consisting of a plurality of connectors and terminated wires is completely assembled.

Other features and advantages of the invention will be apparent from the following description taken in connection with the accompanying drawings.

DETAILED DESCRIPTION OF THE PREFERRED EMBODIMENTS

Figure 1:
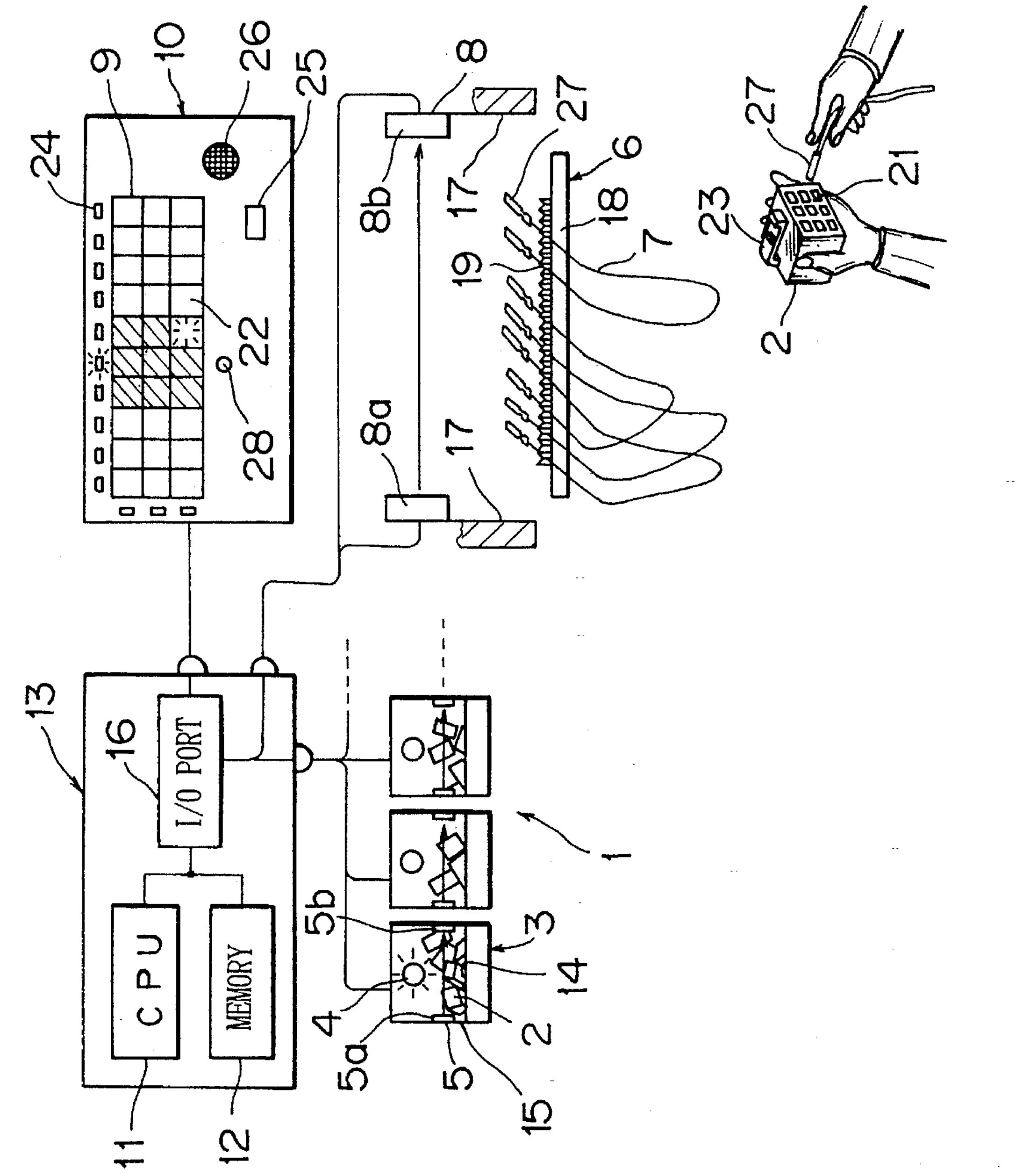
FIG. 1 is a schematic diagram showing the overall view of one embodiment of the assembly guiding apparatus for wiring harness subassemblies according to this invention.

FIG. 1 shows one embodiment of the assembly guiding apparatus for wiring harness subassemblies according to this invention.

The assembly guiding apparatus 1 comprises: a plurality of connector boxes 3 each containing one of different kinds of connectors 2; an indicator lamp 4 and light interception sensor 5, both installed in each connector box 3; an incrementing sensor 8 of light interception type installed on the pick-up side of terminated wires 7 that are arranged in line on a rod-like wire supporting device 6; an indicator 10 having a display 9 that indicates with light a contour of the connector 2 and positions of terminal accommodating chambers in the connector 2; and a controller 13 incorporating a CPU (central processing unit) 11 and a memory 12 and connected to the light interception sensor 5, the incrementing sensor 8 and the indicator 10.

The connector boxes 3 are arranged in line widthwise and each contain one of different kinds of connectors 2. The indicator lamp 4 is installed at the upper part of each of the boxes 3 to indicate from which box the connector 2 should be taken out. On the side walls 15 of each box 3 is installed the light interception sensor 5 made up of opposed light emitting element 5_a_ and light receiving element 5_b_. The light interception sensor 5 is turned on when the light is intercepted by hand of an assembly worker who picks up the connector. The indicator lamp 4 and the light interception sensor 5 are connected to the CPU 11 and memory 12 via an I/O port 16 in the controller 13.

Figure 3:
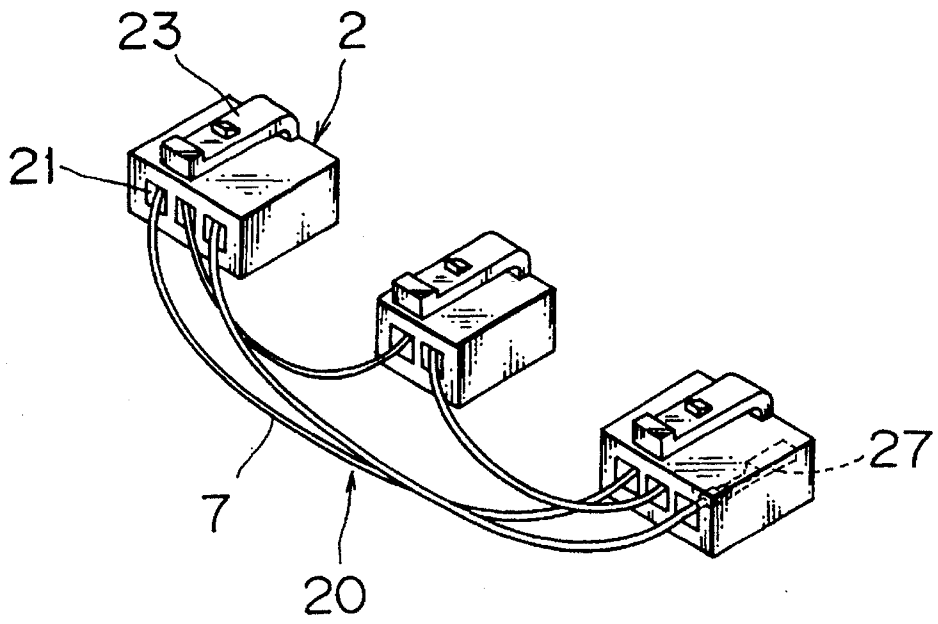
FIG. 3 is a perspective view showing a completed wiring harness subassembly.
Figure 4:
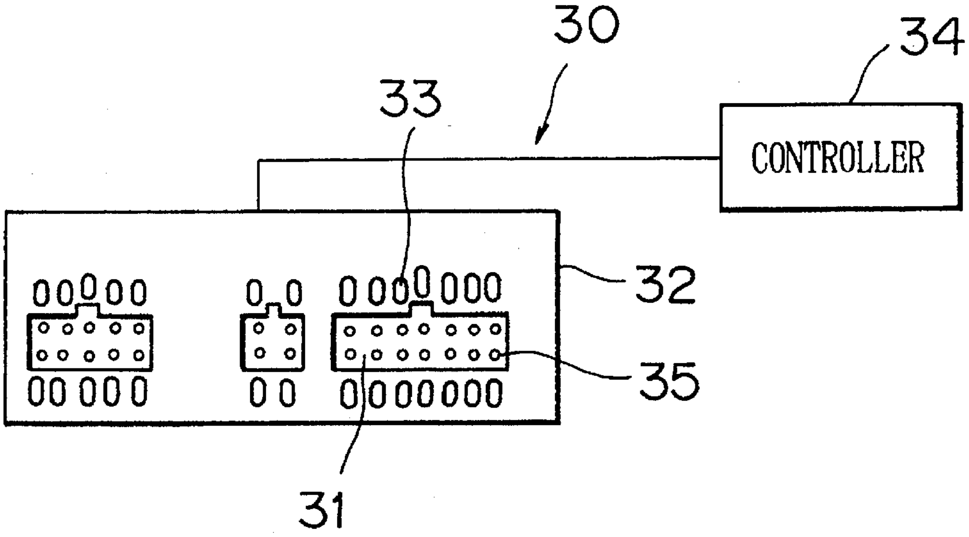
FIG. 4 PRIOR ART
FIG. 4 is an overall schematic view of a conventional apparatus.

The incrementing sensor 8 and the indicator 10 are both connected to the CPU 11 and the memory 12 through the I/0 port 16. The incrementing sensor 8, like the light interception sensor 5, consists of opposed light emitting element 8*a* and light receiving element 8*b*, both arranged on vertical walls 17 located on both sides of the wire supporting device 6, and is turned on when intercepted by a hand of the worker picking up the terminated wire 7 from the wire supporting device 6. To prevent undesired detection of details of the worker's hand, such as individual fingers, the incrementing sensor 8 is given a time constant to prevent chattering. The wire supporting device 6 is of a known type in which a plurality of wire clips 19 are erected on a rod portion 18. The terminated wires 7 are fitted in the clips 19 in the order of use, beginning with one end of the wire supporting device 6 and ending with the other end. The wire supporting device 6 is changed according to the kind of the wiring harness subassembly 20 (FIG. 3). The indicator 10 comprises: a display 9 consisting of a partitioned area 22 having a plurality of light emitting diodes (LEDs) that correspond to individual terminal accommodating chambers 21 (FIG. 3) in the connector 2; a plurality of lock position indicator lamps (LEDs) 24 arranged around the display 9 to indicate the position of a lock arm 23 of the connector 2 for easy identification of top and bottom of the connector 2; a starting switch 25 to turn on the lamps 4, 24 and the display 9; and a buzzer 26 to inform the worker of the incrementing timing. The worker, while watching the display 9 of the indicator 10, inserts the terminals 27 into the connector 2 held by the hand.

Figure 2:
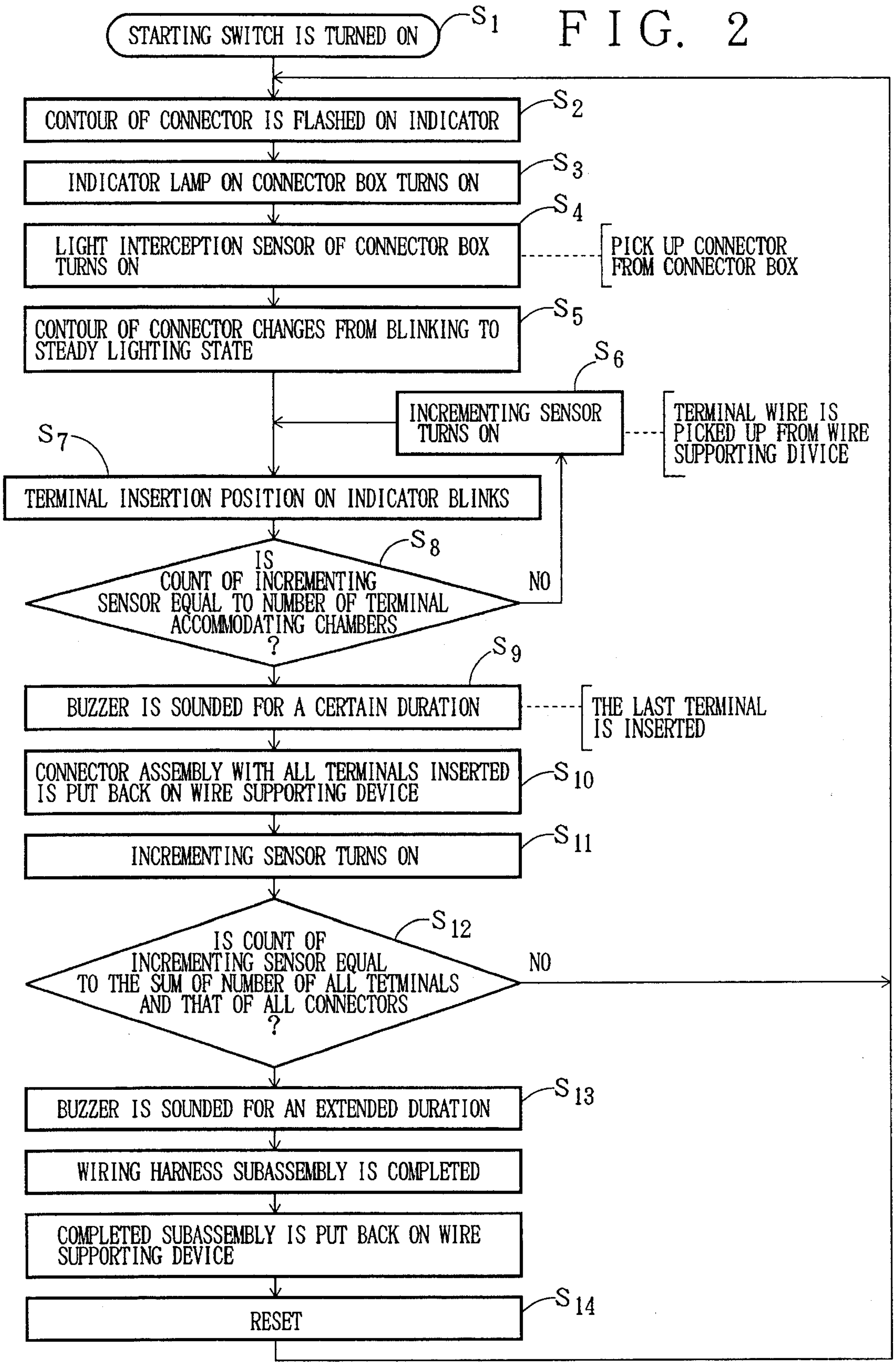
FIG. 2 is a flowchart of the operation of the apparatus.

FIG. 2 shows the operation flow of the above-mentioned assembly guiding apparatus. When the starting switch 25 is turned on (S1), the contour of the connector to be used is displayed flashing on the indicator 10 (S2) and at the same time the indicator lamp 4 on the connector box 3 blinks (S3). The kinds of connectors 2 to be used are entered beforehand into the memory 12 in the order of use. When a worker picks up a connector 2 from the connector box 3 indicated by the indicator lamp 4, the light interception sensor 5 turns on (S4) to change the lighting state of the connector contour on the indicator 10 from blinking to steady state lighting (S5).

Next, when the worker picks up a terminated wire 7 from the wire supporting device 6, the incrementing sensor 8 turns on (S6) to blink the terminal insertion position on the indicator 10 (S7), indicating the terminal accommodating chamber 21 into which the terminal 27 is to be inserted. The operation of the incrementing sensor 8 and the blinking of the terminal insertion position on the indicator 10 are repeated (S2–S7) until all the terminals 27 are inserted into the connector 2 or until the count of the incrementing sensor 8 is equal to the number of terminal accommodating chambers 21 in the connector 2 stored in the memory (S8). When the insertion position in the connector 2 for the last terminal 27 is blinked, the buzzer 26 is sounded for a certain duration and a lamp 28 on the indicator 10 is lighted (S9), informing the worker that the terminal 27 the worker is going to install is the last one (i. e., there is only one terminal accommodating chamber 21 left that should be inserted into).

Upon hearing the sounding buzzer 26, the worker puts the connector assembly (with all terminals inserted) back on the wire supporting device 6 (S10). This causes the incrementing sensor 8 to turn on (S11) and the above series of operations from S2 to S11 are repeated until the count of the incrementing sensor 8 is equal to the sum of the number of all terminals of the wiring harness subassembly 20 and the number of all connectors (S12). When, after all the terminals 27 are inserted into the connector 2 (completing a wiring harness subassembly 20 as shown in FIG. 3, for example), the last connector assembly is returned onto the wire supporting device 6, the buzzer 26 is sounded for an extended duration, notifying the worker of the completion of the assembly work (S13). At the same time, the guiding apparatus 1 is reset to the initial value (S14), giving instructions for the next assembly work.

With this invention, because the indicator displays the connector contour and the terminal insertion position, the guiding of the terminal insertion procedure can be done for any shape of connector by simply changing the data entered into the memory. This in turn enables changes in design and switching of wiring harness type to be dealt with quickly by making simple changes in software and also reduces the size of the apparatus when compared with the conventional one, lowering the cost and simplifying the work procedures. Furthermore, because the worker can hold the connector and insert terminals while watching the indicator, the work efficiency is improved.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An assembly guiding apparatus for wiring harness subassemblies comprising:

a plurality of connector boxes containing connectors, each of which is provided with an indicator lamp and a light interception sensor facing a connector pick-up opening;

an incrementing sensor installed on the pick-up side of terminated wires that are arranged in line on a wire supporting device, said incrementing sensor being of a light intercepting sensor;

an indicator that indicates with light a contour of the connector and positions of terminal accommodating chambers in the connector; and a controller incorporating a CPU and a memory, both connected to the indicator lamp, the light interception sensor, the incrementing sensor and the indictor;

wherein the controller displays the contour of the connector stored in the memory onto the indicator, turns on the indicator lamp of the connector box containing connectors whose shape is the same as that of the contour stored in the memory, and successively displays on the indicator the positions of the terminal accommodating chambers stored in the memory each time the incrementing sensor is activated.

2. An assembly guiding apparatus for wiring harness subassemblies according to claim 1, further comprising a means to annunciate when there is only one terminal accommodating chamber left in each connector being assembled.

3. An assembly guiding apparatus for wiring harness subassemblies according to claim 1, further comprising:

a count means linked to the incrementing sensor to detect the number of remaining terminal accommodating chambers in the connector; and an annunciator means which is activated when the number of remaining terminal accommodating chambers in the connector is one.

4. An assembly guiding apparatus for wiring harness subassemblies according to claim 1 to 3, wherein a means is provided to annunciate when there is only one terminal accommodating chamber left in the wiring harness subassembly being assembled, and the indicator and counter are reset to the initial value when the completed wiring harness subassembly is put back on the wire supporting device.

5. An assembly guiding apparatus for wiring harness subassemblies according to claim 1 to 3, further comprising:

a count means linked to the incrementing sensor to count the sum of the number of all terminals in the wiring harness subassembly and the number of all connectors when a terminal is taken from the wire supporting device and when the connector is put back onto the wire supporting device; and an annunciator and a reset means, both activated when the sum is counted.

* * * * *